US007379931B2

(12) United States Patent
Morinville

(10) Patent No.: US 7,379,931 B2
(45) Date of Patent: May 27, 2008

(54) SYSTEMS AND METHODS FOR SIGNATURE LOOP AUTHORIZING USING AN APPROVAL MATRIX

(76) Inventor: Paul V. Morinville, 202 Allen Cir., Georgetown, TX (US) 78628

( * ) Notice: Subject to any disclaimer, the term of this patent is extended or adjusted under 35 U.S.C. 154(b) by 377 days.

(21) Appl. No.: 11/107,037

(22) Filed: Apr. 15, 2005

(65) Prior Publication Data
US 2005/0187927 A1 Aug. 25, 2005

Related U.S. Application Data

(63) Continuation of application No. 09/990,954, filed on Nov. 21, 2001, now Pat. No. 7,251,666, which is a continuation-in-part of application No. 09/770,163, filed on Jan. 26, 2001, now abandoned.

(60) Provisional application No. 60/179,555, filed on Feb. 1, 2000.

(51) Int. Cl.
G06F 17/30 (2006.01)
(52) U.S. Cl. .......................... 707/3; 707/101; 707/102
(58) Field of Classification Search .................. 707/1, 707/6, 104.1; 705/8, 38, 51
See application file for complete search history.

(56) References Cited

U.S. PATENT DOCUMENTS 5,703,951 A * 12/1997 Dolphin ........................ 705/51
6,862,585 B2 * 3/2005 Planalp et al. ................ 707/1
7,185,010 B2 * 2/2007 Morinville ..................... 707/6
2002/0062240 A1 * 5/2002 Morinville ..................... 705/8
2003/0172025 A1 * 9/2003 Gallina ......................... 705/38

OTHER PUBLICATIONS

"Academic Approval Matrix", published Apr. 20, 2000, located on Internet at http://www.uwm.edu/Dept/SecU/acad+admin_policies/matrix_table.pdf.*
"HR Action From Signature Approval Matrix", published Apr. 2003, located on Internet at http://www.merrimack.edu/uploads/Human_Resource/files/MatrixB.pdf.*
"GGPNC Approval Matrix", published Mar. 18, 2003, located on Internet at http://ggpnc.org/ggbf_approval_matrix.pdf.*

* cited by examiner

Primary Examiner—Sana Al-Hashemi
(74) Attorney, Agent, or Firm—Law Offices of Mark L. Berrier

(57) ABSTRACT

Systems and methods for identifying which of a plurality of roles is required to authorize a business process. In one embodiment, an approval matrix includes rows and columns, where each column defines a potential condition and each row defines an approval role. Each entry in the approval matrix is defined by a corresponding row and a corresponding column, and contains information defining whether the approval role in the corresponding row is required for the business process when the potential condition in the corresponding column is met. A set of conditions that apply to the business process is determined and a set of entries in the columns defining conditions that apply to the business process are identified. The approval roles defined by the identified entries in the approval matrix are then determined to be the roles required to authorize the business process.

16 Claims, 10 Drawing Sheets

| Trip Point Matrix | | | Normal Order ID | Shipping Type Order +Overnight | Cost Order >1000 | Quantity Order >1 | Date Order +5 |
|---|---|---|---|---|---|---|---|
| Approval Matrix | Title | CEO | | | | | |
| | | SVP | | | | 3 | 3 |
| | | VP | | | 2 | X | X |
| | | Director | 1 | 1 | X | 2 | 2 |
| | Mgmt levels | # Levels | 1 | 2 | 1 | X | X |
| | Role | HR Generalist | X | 1 | 1 | 1 | 1 |
| | | Controller | 1 | X | X | 1 | 1 |
| | | Procurement | | | X | X | X |

← 41 (Normal Order ID)  
← 42 (Cost Order >1000)  
← 43 (Quantity Order >1)

Fig. 7

SYSTEMS AND METHODS FOR SIGNATURE LOOP AUTHORIZING USING AN APPROVAL MATRIX

CROSS-REFERENCE TO RELATED APPLICATIONS

This application is a continuation of application Ser. No. 09/990,954, filed Nov. 21, 2001, now U.S. Pat. No. 7,251,666, issued Jul. 31, 2007, which is a continuation in part of U.S. patent application Ser. No. 09/770,163 filed Jan. 26, 2001 now abandoned, which claims priority to U.S. provisional patent application Ser. No. 60/179,555, by Paul Morinville, filed on Feb. 1, 2000, all of which are incorporated by reference as if set forth herein in their entirety.

FIELD OF THE INVENTION

The invention relates generally to systems and methods for automating business processes, and more specifically to systems and methods for providing automated signature looping using an approval matrix.

BACKGROUND

Market conditions have driven companies to leverage employees, partners, suppliers, customers and information to reduce costs. To successfully accomplish this, organizations must efficiently control the way people, resources and information technology interact. This can be referred to as Business Process Management (BPM).

Business processes are used to control costs, to speed production, to increase resource efficiency and to control information that is shared among internal and external participants. Thousands of business processes permeate such areas as engineering, manufacturing, distribution, sales, branding, marketing, advertising, purchasing, corporate communications, legal, customer relations, finance, staffing, payroll, benefits, training, employee records and more.

Most business processes are manual, paper-based systems. Some are managed in software applications. As companies grow, they will generally employ 15 to 100 different software applications, each of which governs its own set of business processes. Applications typically secure information by controlling access, which is done by setting up accounts and then manually entering (typing in) employee information (e.g., names). The applications also control business processes by assigning certain employees to approve certain business processes. Again, this information is manually entered.

When an employee is hired, promoted, transferred or leaves the company, a cascade of manual changes must be made in every affected application. This is illustrated in FIG. 1. Administrators, shown at the bottom of the figure, perform these changes. When a company reorganizes, it can take weeks to make all the necessary changes. Similar changes must be made when the company modifies its business processes or the responsibilities of people within the company.

Most applications capture information necessary to project the outcome and cost of each business process. Companies use Analysts to pull information into spreadsheets and then feed this information into financial and reporting systems. This can delay management access to critical information by days or weeks and often yields erroneous information.

If management finds it necessary to change a specific business process, the people who can access the business process, or the people who approve the process can be changed. This is normally done through e-mails, meetings, and phone calls to functional and departmental heads who determine which employees should be added or deleted from the access and authorization rolls. Typically, when a business process is changed, management gives to system administrators a list of applications that are affected. The system administrators must then type in the new information and delete the old information. This process can take weeks. During this time, employees may or may not know what has changed, and the change has not been completely implemented, so it may be very difficult to enforce the modified business process.

Incredible inefficiencies and hard cash losses can be directly associated with poor business process management. Companies must employ extra people to manage, drive, audit and report on business processes. It is not unusual for new employees to start 30 days before their phones are turned on, for computers to get "lost", for payroll, credit cards, phones and building access to remain valid after employees terminate, for bureaucracy to build, for employees to become confused and dissatisfied, for management's span of control to become restricted, for the security of information to break down, and more.

Market Landscape. Paper Systems and Simple Applications. In small businesses, the vast majority of business processes are managed on paper systems, although simple applications may be used to manage highly administrative functions like payroll, finance and benefits. Most business processes are either verbal, or forms are filled out and forwarded (by hand or e-mail) to approvers and administrators. In small companies this method is effective and keeps associated costs down.

Workflow Applications. Generally, as companies grow past 250-300 employees, manual business processes break down and the companies begin to purchase specialized workflow applications for business processes involving staffing, HRIS, purchasing, inventory, expense reporting, CRM, sales, etc. These applications are generally available as "shrink wrap" software installed on company hardware (or rented as an application service). Annual costs for each application can range from $50 to $1200 per employee.

Enterprise Resource Planning (ERP). ERP systems (SAP, PeopleSoft, JD Edwards, Baan, Great Plains and others) are first and foremost financial systems. They are designed to seamlessly integrate legacy applications and their own applications into a single financial application. An ERP implementation is an enormous undertaking that integrates all the backend systems and maps and builds business processes. The integration of information has great value, but business processes are "hard-wired" and require administration of access and approval. This results in an extremely rigid system that is like a house of cards that has to be reconstructed every time the something changes.

Signature Looping. Signature looping is the process of identifying people within the company that are involved in a business process, notifying them that their participation is required for a particular process that has been initiated, and possibly obtaining their approvals of the process.

Most competitive systems which are capable of automating signature looping do so by traversing the company's organizational structure directly up the chain of command as illustrated in FIG. 2. The customer defines the number of levels of management that the business process requires and the system will automatically find the requester's superiors and forward information to them. These systems can identify the direct reporting manager, the second level manager and any others up to the CEO, but they cannot identify functional approvers like Finance or HR employees who are not directly above the requester in the organization.

In a small organization, this type of approval may be manageable, but in complex, fast changing or geographically distributed organizations, it becomes very difficult. This difficulty arises from a number of factors. For example, in a larger organization, approval functions may be assigned to a position which, because of the complex organizational structure, is not directly above the requesting position. Further, in most systems, lists of functional approvers are manually maintained for each employee with access to a particular business process.

While some products allow signature looping to be based on the roles of employees rather than simply their positions, these products also normally require manual maintenance of lists which identify specific approvers for specific employees and specific business processes.

A software platform that can bridge business process gaps between people, resources and systems is therefore necessary to increase the amount of information which is available, to increase control and to increase efficiency.

SUMMARY

One or more of the problems outlined above may be solved by the various embodiments of the invention. Broadly speaking, the invention comprises systems and methods for automating and increasing the efficiency of business processes using a role structure which is preferably hierarchical. The hierarchical role structure defines a plurality of roles within several hierarchical levels. Various rights (e.g., access rights or authorization rights) are associated with the different roles or levels to enable positions which are associated with the roles to have access to particular business processes (e.g., purchasing or hiring). In this way, access rights can be administered across more than one position at a time, and can be consistently applied across equivalent or similar positions. In one embodiment, the role structure is used in conjunction with a hierarchical organization structure to allow the organization structure to be searched for positions which are associated with a particular role. As a result, automatic authorization loops (signature loops) which are not restricted to direct superiors within the organization can be implemented. The hierarchical role structure can also be used in conjunction with a hierarchical content structure to enable employees having different roles within the organization to access different information, based upon rights which are associated with those roles.

In one embodiment, the present invention comprises a business process management system which is configured to utilize both an organizational structure and a role structure to identify positions within a company. These data structures, used in combination, may enable the efficiency of business processes to be improved in a number of ways. For example, signature looping processes can be configured to identify approvers or other participants in a business process based upon their roles in the company, and not simply their positions within the organization. A preferred embodiment implements a role-based search for these participants which is capable of identifying positions that are not directly up the chain of command from a particular position in the organization. The role based searching of the preferred embodiment also eliminates the need for maintaining individual lists of approvers/participants corresponding to each combination of positions and business processes. The preferred embodiment also implements a role structure which is hierarchical in order to facilitate propagation of information within the system. Roles within the hierarchical structure are able to inherit rights and/or restrictions from higher levels of the hierarchy, so that changes in these rights/restrictions need not be entered onto a position-by-position basis. the same is true for both accessing business processes and accessing company information.

Various alternative embodiments of the invention are possible, as will be described below, and as will be evident to persons of skill in the art of the invention upon reading this disclosure. The descriptions here and are therefore intended to be illustrative, rather than limiting of the invention which is claimed below.

BRIEF DESCRIPTION OF THE DRAWINGS

Other objects and advantages of the invention may become apparent upon reading the following detailed description and upon reference to the accompanying drawings.

FIG. 7 is a diagram illustrating an approval matrix and the use of trip points therein in one embodiment of the invention.

Figure 1:
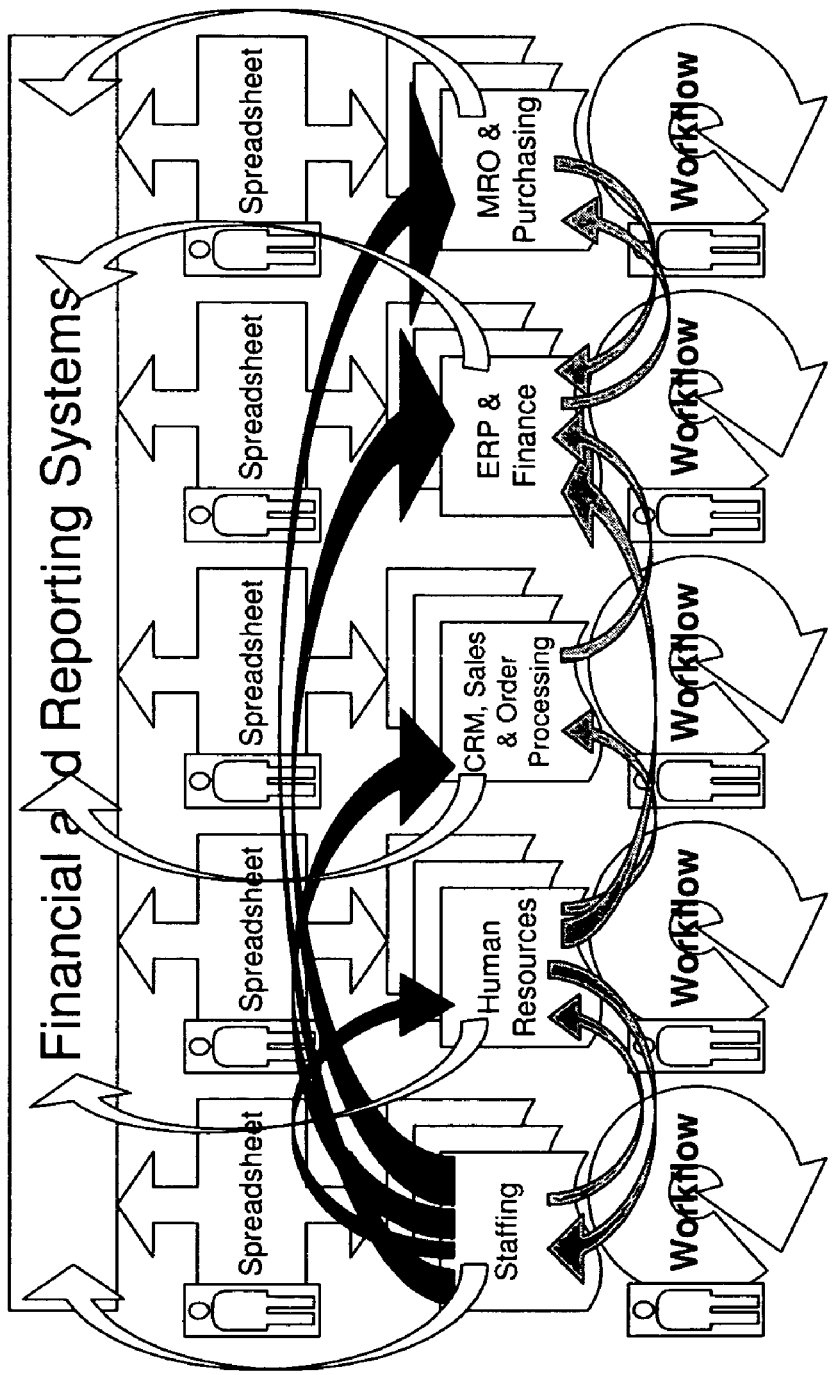
FIG. 1 is a diagram illustrating the manual changes which must be made to a company's applications and data when a change occurs in the structure or business processes of the company.
Figure 2:
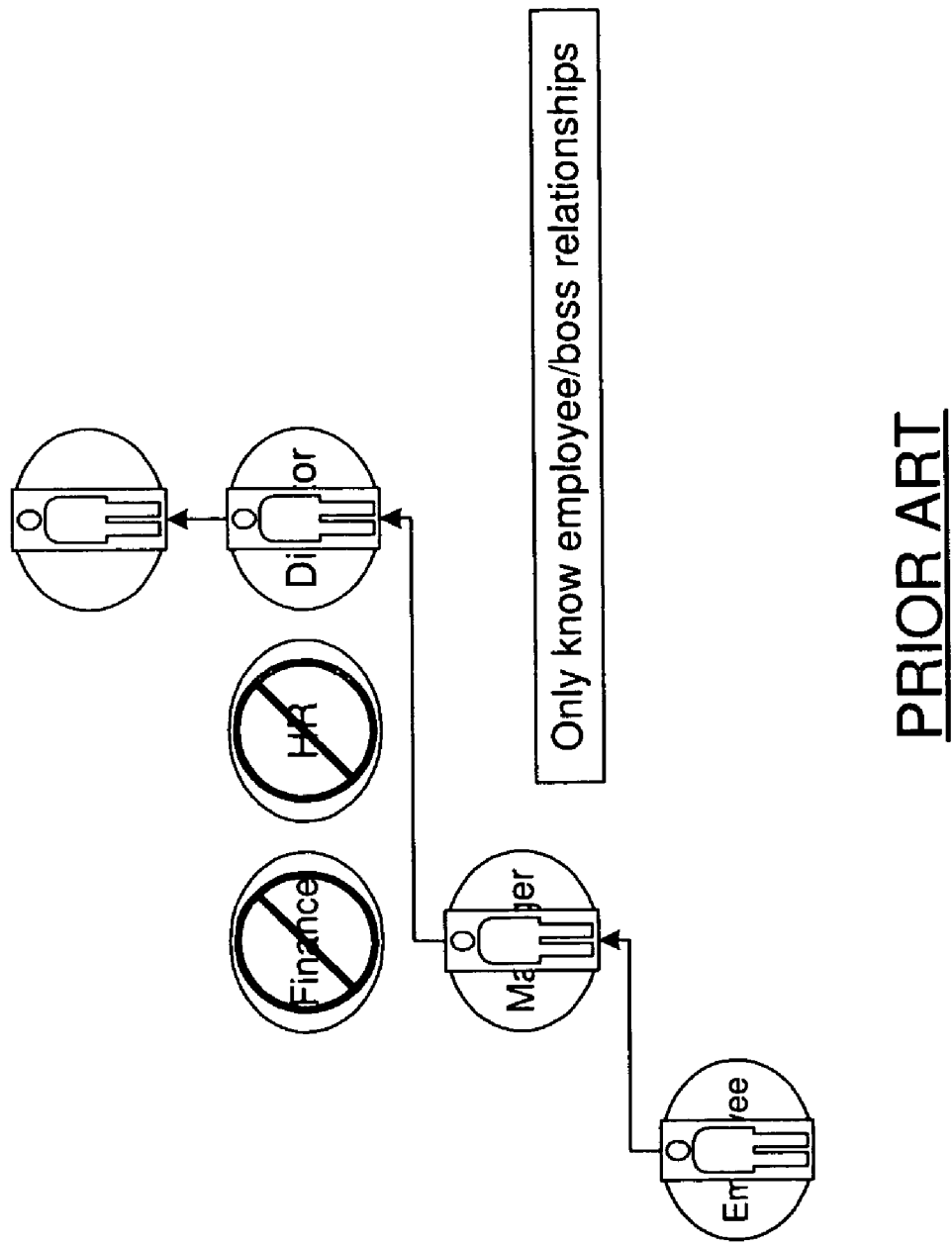
FIG. 2 is a diagram illustrating the limitation of prior art systems that only positions directly upward in a person's chain of command can be identified as participants in a business process associated with that person.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for automating and increasing the efficiency of business processes using a hierarchical role structure. The hierarchical role structure defines a plurality of roles within several hierarchical levels. Various rights (e.g., access rights or authorization rights) are associated with the different roles or levels to enable positions which are associated with the roles to have particular access to certain business processes (e.g., purchasing or hiring). In this way, access rights can be administered across more than one position at a time, and can be consistently applied across equivalent or similar positions. In one embodiment, the hierarchical role structure is used in conjunction with a hierarchical organization structure to allow the organization structure to be searched for positions which are associated with a particular role. As a result, automatic authorization loops (signature loops) which are not restricted to direct superiors within the organization can be implemented. The hierarchical role structure can also be used in conjunction with a hierarchical content structure to enable employees having different roles within the organization to access different information, based upon rights which are associated with those roles.

In one embodiment, the present systems and methods are implemented in an enterprise-class business process management application. This application provides a business processor engine which can draw information from both internal and external sources, use this information in the management of business processes, and communicate resulting information to users which may include employees, management, partners, vendors, consultants, customers and the like. The application enables the analysis and reporting of real-time information and thereby allows users to make timely and accurate business decisions. The application also provides a central point for management of business processes and thereby enables the implementation of management decisions quickly and consistently across a company's entire workforce.

The application of the preferred embodiment is built on three hierarchical data structures: an organizational structure; a role structure; and a content structure. The organizational structure comprises a hierarchical organization of the positions within the company. Each position can be uniquely identified. The positions can be used as a mechanism for tracking people (employees) and assets which are assigned to the respective positions, as well as services and business processes which are associated with the positions. The role structure comprises a hierarchical organization of roles within the company. Each role is a subset or specialization of the roles which are superior to it in the role structure. Each role can be associated with one or more of the company's employees and used as the basis for controlling those employees' access to particular business processes. The content structure comprises a hierarchical organization of subsets of the company's data (e.g., business process content). Access to each of the subsets of data can be controlled independently, so that certain types of data are accessible only to certain roles within the company.

Figure 3:
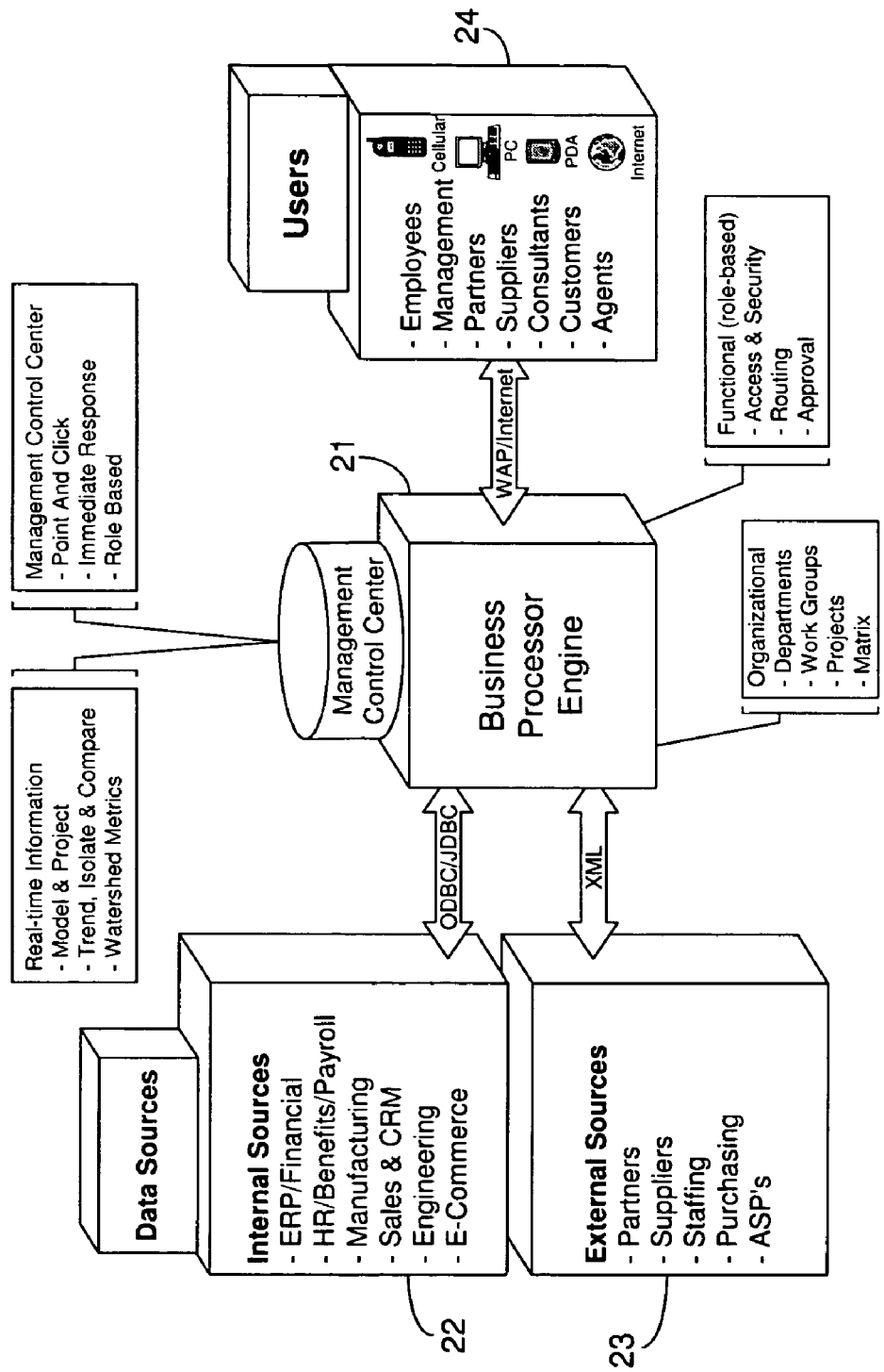
FIG. 3 is a diagram illustrating the structure of a system for the administration of business processes in accordance with one embodiment of the invention.

Referring to FIG. 3, a diagram illustrating the structure of a system for the administration of business processes in accordance with one embodiment of the invention is shown. The system comprises a business processor engine 21 which is coupled to internal data sources 22 and external data sources 23, as well as users 24. Business processor engine 21 is configured to control requests submitted by users 24 to access business processes. Business processor 21 determines whether the requesting user is authorized to access the requested process based on information such as organizational data (e.g., the department, workgroup or project of the user), functional data (e.g., security, routing or approval information) or other data which is available to the system. If the requested business process is authorized to proceed, business processor engine 21 may access data such as ERP/financial data, HR/benefits/payroll data, manufacturing data, sales/CRM data engineering data or e-commerce data from internal sources 22. Likewise, business processor engine 21 may access data such as partner lists, supplier lists, staffing information, purchasing data or ASP information from the external data sources 23.

The business processor engine makes use of three hierarchical data structures: an organizational structure; a role structure; and a content structure. These data structures provide a basis for the distinctive capabilities of the system. These capabilities relate to, among other things, the manner in which automated signature looping and information routing is performed, the manner in which acquisition maintenance and termination of positions, roles, people and inventory is accomplished, and the manner in which metrics are used and reporting is performed by the system.

Hierarchical Organizational Structure

Figure 4:
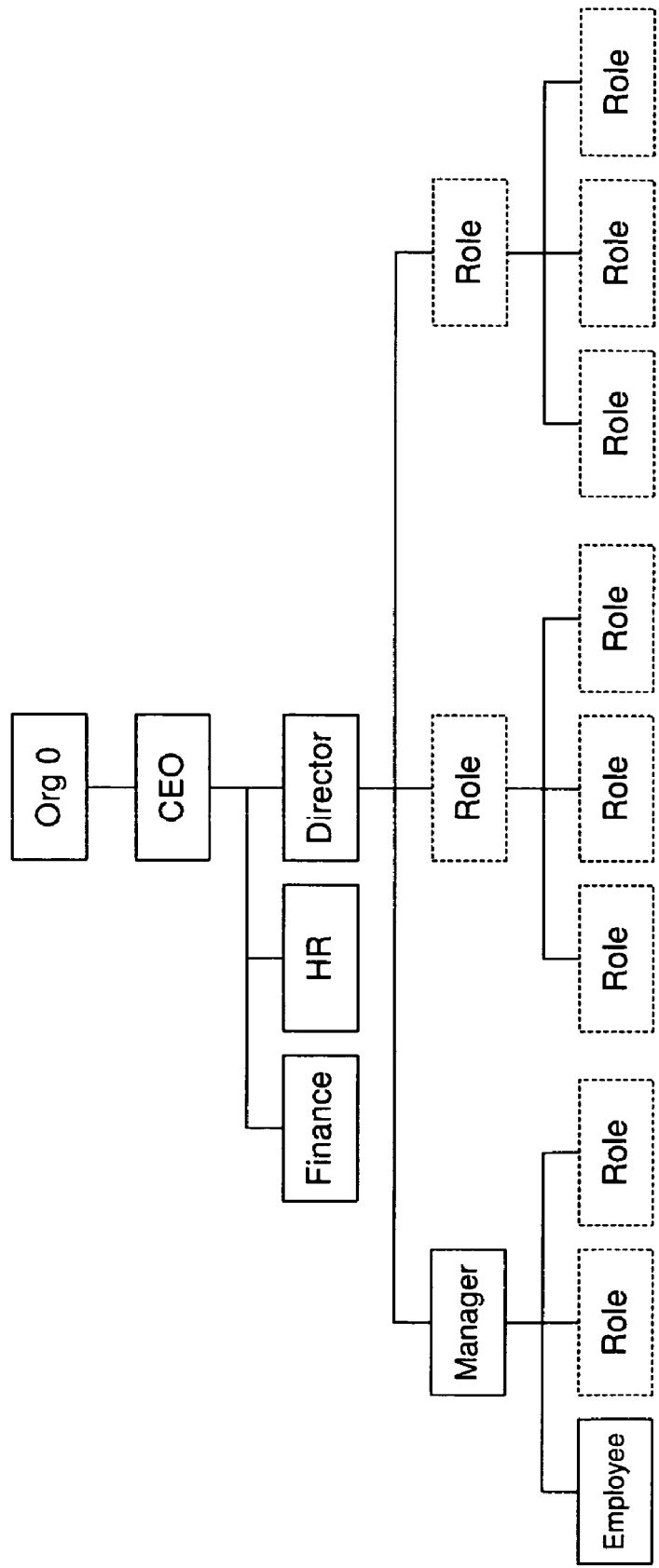
FIG. 4 is a hierarchical organizational structure which comprises a series of positions reporting to other positions.

Referring to FIG. 4, the organizational structure is a hierarchical data structure of positions reporting to positions. Each position has an associated role which is used to control access to business processes and information. (In some embodiments, there may be more than one role associated with each position.) The role is also used as the basis for identifying employees, contingent workers, vendors and partners for collaboration during business processes. Each position contains its own functional job description, functional title and mailing address. Each position can be identified from all other position by its place in the organizational structure. Each position is a tracking location for people, fixed assets, services and business processes.

In a preferred embodiment, the highest-level position in the organizational structure is "Org 0" (the organization). Org 0 is the only position in the organizational structure without a superior position. All positions ultimately report to Org 0. Org 0 serves as a repository for corporate information and as the location to track unassigned assets and services.

In a preferred embodiment, the position of Org 0 in the organizational structure is defined in the system by the following rules: Org 0 cannot be created by the user, but is already programmed into the system when it is distributed to customers; Org 0 can only be the top position of the organizational structure; Org 0 cannot have a superior position; Org 0 is the only position containing corporate information like billing address, banking information, etc.; Org 0 cannot have people tracked to it; Org 0 cannot be an approver; Org 0 must have one subordinate position (usually the CEO); and Org 0 cannot have more than one directly subordinate position.

In the preferred embodiment, positions other than Org 0 are defined by the following rules: they must have a superior position; they cannot have more than one superior position; they can have n direct subordinate positions; they must have a role; they cannot have more than one role; they can have an active user; they cannot have more than one active user (a user is normally an employee or contractor, but can be a vendor, partner or consultant); when a position is transferred, its role and all tracked people, assets, services and business processes as well as all direct and indirect subordinate positions transfer with it; and a position cannot be terminated with active people, assets, services, business processes, or subordinate positions.

Hierarchical Role Structure

Figure 5:
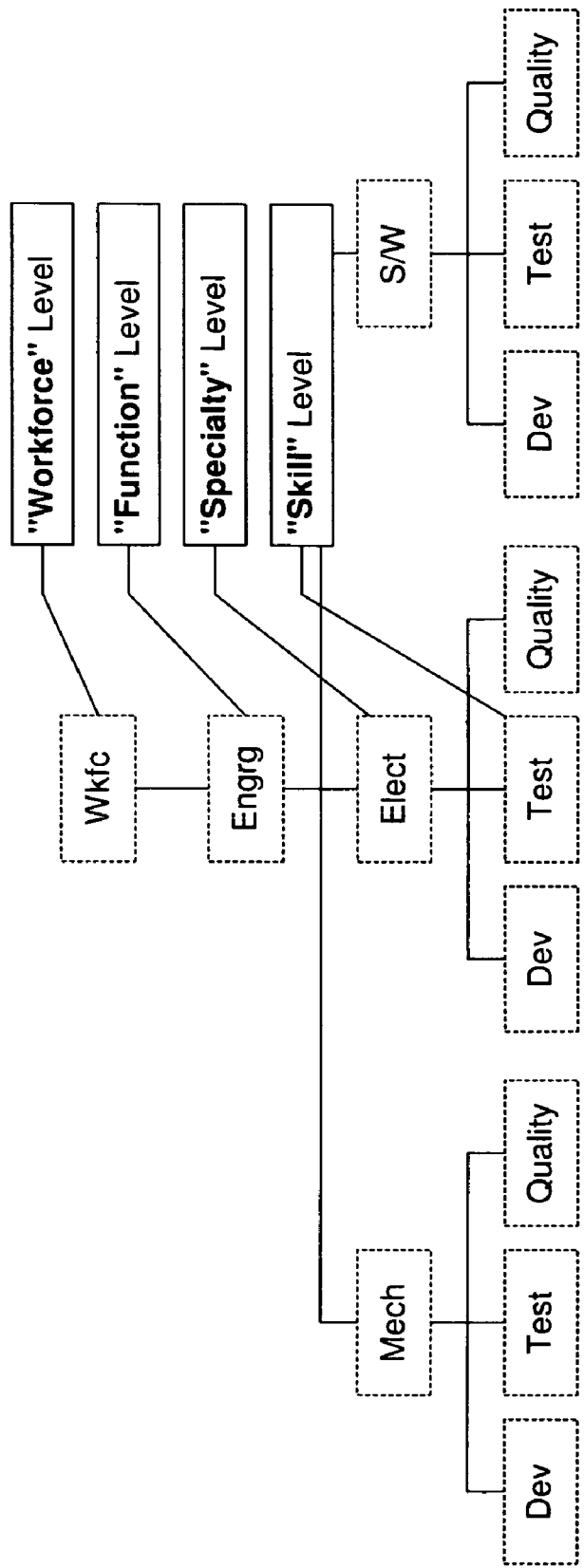
FIG. 5 is a hierarchical role structure in which the roles of people in the company are broken down into smaller and smaller subsets or specializations within a given role.

Referring to FIG. 5, the role structure comprises a hierarchical organization of roles within the company. Each role is a subset or specialization of the roles which are superior to it in the role structure. Each role can be associated with one or more of the positions in the organizational structure, and is used as the basis for controlling the access of those employees associated with the corresponding organizational positions to particular business processes.

In a preferred embodiment, the hierarchical role structure comprises nine levels in three categories: functional role, superiority and legal. Each role in the organization can be related to the other roles in terms of these categories. For example, in FIG. 5, role 31 (Test) is a skill within the Mechanical specialty 32, which is in turn a subset of the Engineering function 33. It should be noted that the roles within each category may be independent of the roles in other categories. In other words, the levels associated with superiority roles or legal roles do not necessarily have a predetermined relationship to the levels associated with the functional roles. The functional, superiority and legal hierarchies may be coincident only at the organization (Org 0) level.

The role structure is used to provide the position, and thereby the user, with access to information and business processes; to identify positions in the organizational structure for collaboration on business processes (e.g., requesters and approvers); and to administer job related information through libraries containing information such as legal documentation, job descriptions, performance plan templates and compensation information.

As a result of the hierarchical function structure, access rights to business processes are inherited from one level of the hierarchy to another. A particular function has the access rights assigned to that function, as well as access rights to any function about it in the hierarchy. This enables the administration of large groups of employees at the same time, rather than forcing it to be done for individual employees. For example, if the hierarchy includes: workforce/HR/recruiters/exempt recruiters, executive recruiters, it is possible to freeze exempt hiring by taking away from the exempt recruiters access to an offer-letter business process. Then, no offers can be made to prospective employees. If this process is initially accessible to all recruiters, moving the access down a level to the executive recruiters results in a situation in which executives can be hired, but exempt employees cannot.

There are several rules relating to the role structure of the preferred embodiment: a role can be associated with many positions; a role is associated with a role is a specialization of the roles which are above it in the hierarchical role structure; a role cannot have more than one superior role; a role can have n direct subordinate roles; a role must be associated with at least one position; and a role can be associated with more than one position.

Functional Role. The first of the three categories to which roles may belong in the preferred embodiment is the category of functional roles. In this embodiment, there are four levels of functional roles. These roles comprise a hierarchical structure starting with "workforce", which is the first level of all roles. Subsets of workforce include major functional skills or roles (such as Finance, Human Resources, Engineering, Sales, Marketing, etc.) These are further broken down into subsets of specialties. The specialty level is then broken down into subsets of skills.

Each level of the functional roles can be linked to page, purchasing or business process content. This allows the company to administer access across all employees, vendors, consultants and partners at the workforce level, to specific groups by function, to specialties within a function, and to skills within a specialty. This enables the company to easily and simultaneously manage access to sensitive information and business processes by participants across the entire company. Functional roles are linked to approval matrixes so that business process approvers can be identified, thereby enabling automated business process collaboration between participants, and enforcement of approval requirements.

Superiority. Superiority is the title or the grade associated with a role. The title identifies the management level (e.g., CEO, SVP, VP, Director, Senior Manager, Manager, Senior Consultant, Consultant, etc.) Title is useful because in most companies, it represents a level of access and decision-making authority that is constant across functions. Title can be linked to business processes in the same manner as the functional role. Grade identifies the compensation band and is linked directly to the compensation library. Grade is not linked to business processes.

Legal. Legal levels consist of class (exempt or non-exempt), EEO classification (professional, skilled, unskilled, management or executive), and employment (full-time, part-time, contingent, vendor, partner, etc.) These levels are primarily useful in metrics and reporting, job description administration, legal job requirements and performance planning.

Libraries. A Library contains information that is linked to role hierarchies. This allows the company to administer information at various levels of the role, and thereby apply broad changes across the entire workforce, function, skill or specialty, or across titles, grades and legal categories from a single location. There may be a number of different libraries, each containing a set of related types of information which are generally administered in the same manner. In the preferred embodiment, the libraries include a compensation library, a setup library, a content library, and a business process library. Other libraries (e.g., a job description library or a performance library) may also be implemented. Descriptions of the libraries and of the types of information which may be found in them follow.

Compensation Library. The role compensation library houses compensation ranges and types for each role. This allows the company to dynamically build and administer the compensation matrix. The compensation matrix is linked the grade level of the role. Each grade level may contain such information as: pay Type (Salary, Hourly, Commission, etc); Pay Range (Minimum, First Quartile, Mid-Point, Third Quartile, Maximum); Bonus (As a % of pay, Target $); Commission Target (%=1−[Base/Annual Target Compensation]); Estimated Annual Compensation (Mid-Point+[Bonus or Commission]); and Hiring Budget Estimates (Agency fee estimated dollars, Relocation type and estimated dollars).

Job Description Library. The job description library houses legal requirements and job descriptions for each level of the role. This allows the company to dynamically build and administer job descriptions, and legal requirements to varying levels of the role.

Performance Library. The Performance Library houses legal requirements and job descriptions for each level of the Role. This allows the company to dynamically build and administer job descriptions, and legal requirements to varying levels of the Role.

Setup Library. The Setup Library houses all of the Product, Services and Business Process Requests necessary to setup a new employee with all of the things necessary to do their job on the first day of work. This allows companies to dynamically manage setup configurations for new employees.

Content Library. The content library houses all of the page content necessary for each role to perform day-to-day business. This information is used to dynamically build pages based on the employee's logged in position.

Business Process Library. The business processes library houses all of the business processes that are necessary for each role to perform day-to-day business. This information is used to allow employee access to business processes and purchases.

Hierarchical Content Structure

Figure 6:
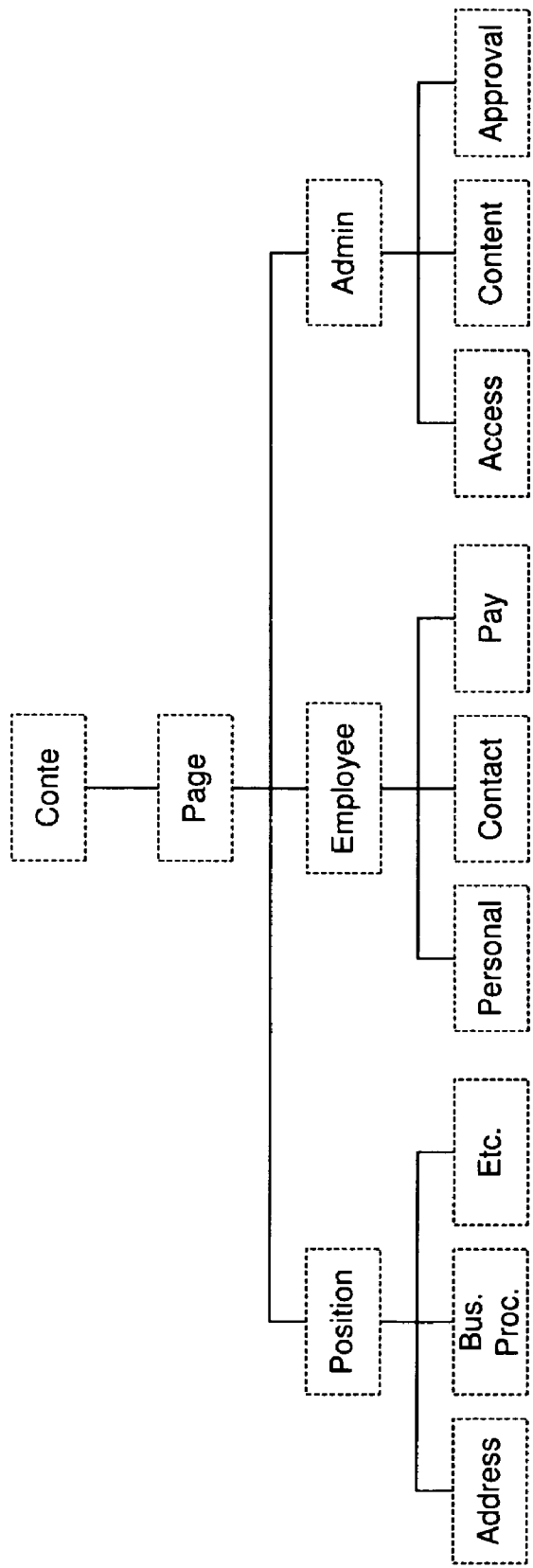
FIG. 6 is a hierarchical content structure which breaks down business information (content) into a plurality of subsets within a higher-level content category.

Referring to FIG. 6, the hierarchical content structure is a hierarchical breakdown of business information (content). The hierarchical content structure can be used in conjunction with the hierarchical role structure to enable employees having different roles within the organization to access different information, based upon rights which are associated with those roles. In a preferred embodiment, the content is broken down into subsets of page content, purchasing content and business process content. Page content is a systematic breakdown of each page starting with the page, breaking down each group of data and breaking down each group of data into individual fields to 4 levels. Purchasing content is a systematic breakdown of assets and services items. business process content is a systematic breakdown of business processes.

In the preferred embodiment, page content is broken down into major data groups. Major data groups are then broken down into minor data groups and minor data groups are broken down into fields. Following is an example of page content 1. Employee Page
   a. Employee Information
      i. Employee Name
         1. First Name
         2. Middle Name
         3. Last Name
      ii. Personal Contact Information
         1. Home Phone
         2. Personal Cell
         3. Personal Pager
         4. Personal Fax
         5. Home e-mail
      iii. Work Contact Information
         1. Work Phone
         2. Work Cell
         3. Work Pager
         4. Work Fax
         5. Work e-mail
      iv. Address
         1. Street
         2. Mailing
         3. City
         4. State
         5. Zip
         6. Country
      v. Personal
         1. Employment Status
         2. Gender
         3. Ethnicity
         4. Veterans Status
         5. Marital Status
         6. SSN
         7. DOB
         8. Visa Status
   b. Links
      i. Personal Information
         1. Benefits
         2. Payroll
         3. Dependants -continued 4. Performance Plan
      ii. Personal History
         1. Training
         2. Education
         3. Experience
         4. References
      iii. Administrative Information
         1. Compensation
         2. Internal Job History
      iv. Administrative Business Processes
         1. Transfer
         2. Training
         3. Change Pay
         4. Create Performance Plan
         5. Change Information
         6. Terminate Following is an example of purchasing content.

1. Office
   a. Supplies
      i. Paper
         1. White Printer
         2. White Letterhead
         3. Legal Pads
      ii. Pens
         1. Papermate 101
         2. Bic retractable
   b. Equipment
      i. Desk
         1. Executive
         2. Engineer
         3. Sales
         4. Staff
2. Computer
   a. Supplies
      i. Printer
         1. HP Office Jet 1150C Color
         2. HP Office Jet 1150C Black
   b. Peripherals
      i. Printer
         1. Department
         2. Workgroup
         3. Individual Automated Signature Looping Signature looping is the process of identifying people within the company that are involved in a business process and notifying them that their participation is required for a particular process that has been initiated. For example, if one employee requests the purchase of a certain item, it may be necessary for another employee to approve the purchase before it can proceed. In the present system, the signature looping process is based upon the roles that exist within the company rather than lists of specific people who are associated with each process. When a business process is initiated by a person having a first role, one or more other roles may be identified as being necessary for the completion of the process. The organization is then searched to find the identified role(s). These roles may be associated with different positions, depending upon the role and/or position of the initiator of the process. In other words, if the same role is associated with two different positions, one of these positions might be identified if a first person initiated the business process, while the other might be identified if a second person initiated the process.

The purpose of automated signature looping is to identify the right participants in a business process (e.g., a request) without the need to manually maintain participant lists. The appropriate participants in the process can then view information associated with the process. This eliminates the need to administer IT accounts (database access and approver accounts) as new participants are brought into the company, moved around or otherwise changed. It also allows for secure collaboration, both across the workforce and with vendors and partners.

Two primary methods of identifying participants are used in a preferred embodiment of the invention: management levels and functional roles. Management levels are the number of levels up from a starting position in the organizational structure. The identification of management levels is accomplished by climbing the organizational structure one position (one level) at a time. This can go on until reaching the final level, which is usually the CEO. If it is necessary to get approval from one management level for a business process, the direct reporting manager (who could hold the title of manager, director, etc.) would be identified. This person could also be referred to as the first level manager. If two management levels are necessary for approval, the first level manager and the second level manager would be identified. The same process is used to identify however any levels of management are necessary.

Functional roles essentially comprise the function of a particular job or position. In the hierarchical role structure, the functional roles end are the first four levels of the structure. Identification of the appropriate functional role is accomplished by climbing the organizational structure one level and looking down through subordinate positions to find the necessary role. This downward search is normally performed in a predetermined manner (e.g., searching one subordinate position and its subordinates before searching the next position at that level). If the role is not found, it is necessary to climb to the next higher level of the organizational structure and look down through the subordinate positions to identify the necessary role. This methodology allows the identification of approvers that are not in the direct chain of command above the initiator of a request.

It should also be noted that the identification of approvers (and/or other participating roles) in a business process may also be based on superiority roles. Superiority Roles are essentially the Titles which correspond to the roles. Identification of roles based on superiority is accomplished in the same manner as Management Levels, except it is not inclusive of the positions between the requesting position and the identified position. In other words, it may be necessary to obtain approval of a director or n-level manager without also getting the approval of the intermediate (n-1-level) managers.

There is no association between role A and role B, except to say that role a gets access to specific things because it is role A. That specific thing might be a request to purchase. The authorization of the request to purchase might then be associated with role B. It doesn't matter where that role (B) resides within the organizational hierarchy—the search will go up a level, then check everything below that position (i.e., subordinate positions). Then up another level and check everything below that position. This is repeated until role B is found.

Using this search method, you can, for example, be a field salesperson on one side of the organization reporting up through 10 levels of management to get to the CEO. On the other side of the organization is manufacturing. Ten levels down is the person who determines what the production capability is. If the salesperson wants 5000 computers in two weeks, someone in manufacturing has to provide that information. The only way to find that person is to go up a level in a the organizational hierarchy and search down, go up another level and search down, and so on until the person is found. In the example of the salesperson and the manufacturing person, the search will go all the way up to the CEO to reach the top of the manufacturing hierarchy, then search all the way back down.

This type of search can find anybody in the entire company. The selected role may be narrowly defined so that only a single person satisfies the selected role, or it may be broadly defined so that several people may satisfy the selected role. If there are several people who have roles which satisfy the search, then, in one embodiment, the first one to be found it is selected.

The connection between the roles may be based on any of a number of relationships. For example, as described above, one role might be authorized to make a purchase request while the other role is authorized to approve the request. As another example, one role might be authorized to interview candidates for employment, while the other role is authorized to send out offer letters to selected candidates.

Approval Matrix. A preferred embodiment of the present invention employs approval matrices to identify the roles which need to be selected for participation in a particular business process. The purpose of the Approval Matrix is to define the participating roles for the business process (possibly based upon one or more conditions relating to the business process) so that the positions corresponding to these roles can be identified. These positions can then be contacted to obtain their participation.

In the preferred embodiment, an approval matrix is associated with every request process. If no approvals are required (i.e., if the requester is authorized to complete the request with no further authorization), the approval matrix will indicate a null approver set (i.e., no approvers are required). Each approval matrix includes an indication of the order in which approvers need to approve the request. It should be noted that, in some embodiments, the approval matrixes may be implemented in a hierarchical structure similar to that of the roles, where each approval matrix would inherit the approval requirements, trip points, etc. of the higher levels of the hierarchy.

Trip Points. A trip point is a condition which can affect the approvers/participants which are identified in connection with a business process. If the condition is met, the corresponding trip point is triggered, altering the identification of approvers. In the preferred embodiment, each trip point has a corresponding set of approvers in the approval matrix. (The trip points may also be contained in a matrix.) The purpose of the trip points is to compare specific request data against predefined data (the trip points) to determine which set of approvers should be used for the request.

Trip points may comprise a variety of different data types. For example, they may comprise quantities, prices, the number of days between two dates, shipping methods, reasons for requests, status of concurrent requests in the business process, or administrator defined conditions. In a preferred embodiment, the trip points are configured according to the following rules: every request process has a trip point matrix; trip points can be null, but they are still needed so they can be changed on the fly; a trip point is inactive if the trip value is null; a trip point is active if the trip value is not null; and a trip point can be set to greater than, less than, or equal to the trip value.

Although the approval matrices and trip points are described herein primarily with respect to request processes, similar approvals may be required for other types of business processes. In these instances, the approval matrices and trip points are implemented in the same manner.

Referring to FIG. 7, a diagram illustrating an approval matrix and the use of trip points therein is shown. The upper portion of the diagram corresponds to a trip point matrix and the lower portion corresponds to an approval matrix. The matrix controls the selection of approvers for a corresponding business process under a variety of scenarios. For example, in a "normal" scenario, the shipping type is not "overnight", the cost of the computer is less than $1000 and the quantity is one. Consequently, the system selects the "normal" set of approvers from column 41. The right side of the column identifies the number of management levels that must approve the process (one), as well as specifying that the controller must approve it (as indicated by the "X" in the corresponding row). The numbers on the left side of the column indicate the order in which the approvals must be obtained. Since both approvals are 1's, they can be concurrently obtained.

Other scenarios may include situations in which one of the conditions specified by the trip points (shipping type, cost, quantity or date) is met. For instance, if the price is greater than $1000 and all other trip points are unmet, the matrix identifies the approvers (in column 42) as a director, one level of management, a controller, and a procurement person. The numbers on the left side of the column indicate that the first level manager, controller, and procurement can approve concurrently, then director approval is obtained last.

If the quantity is greater than 1 and all other trip points are unmet, the first level manager and Controller are identified for simultaneous approval, followed by the first Director directly up the organizational structure, and finally the vice president (see column 43). If multiple trip points are met, the system accumulates the approvers and the approval order from each affected trip point.

Request Process

The purpose of the request process is to capture information from various sources and allow the requester to change information without affecting the source application, then attain approval for the change and allow the requestor to execute the change. The request process also captures information necessary for reporting. The process can generally be described as comprising accessing the request process, triggering the request if no approvals are required, otherwise building a request, summarizing the request, approving the request and executing the request.

Access. Access to the request process is triggered automatically by a user. If the users' role is authorized to initiate the request (a specific business process), the user can see the request option. Otherwise, if the process is not available to the user, it is not even displayed to the user. If no approvals are required for the request to proceed, it is automatically triggered. If no approvals are necessary and the request requires a completed predecessor, the request process engages automatically upon completion of the predecessor. This allows the company to seamlessly daisy chain requests in an automated series and/or parallel format.

Figure 8:
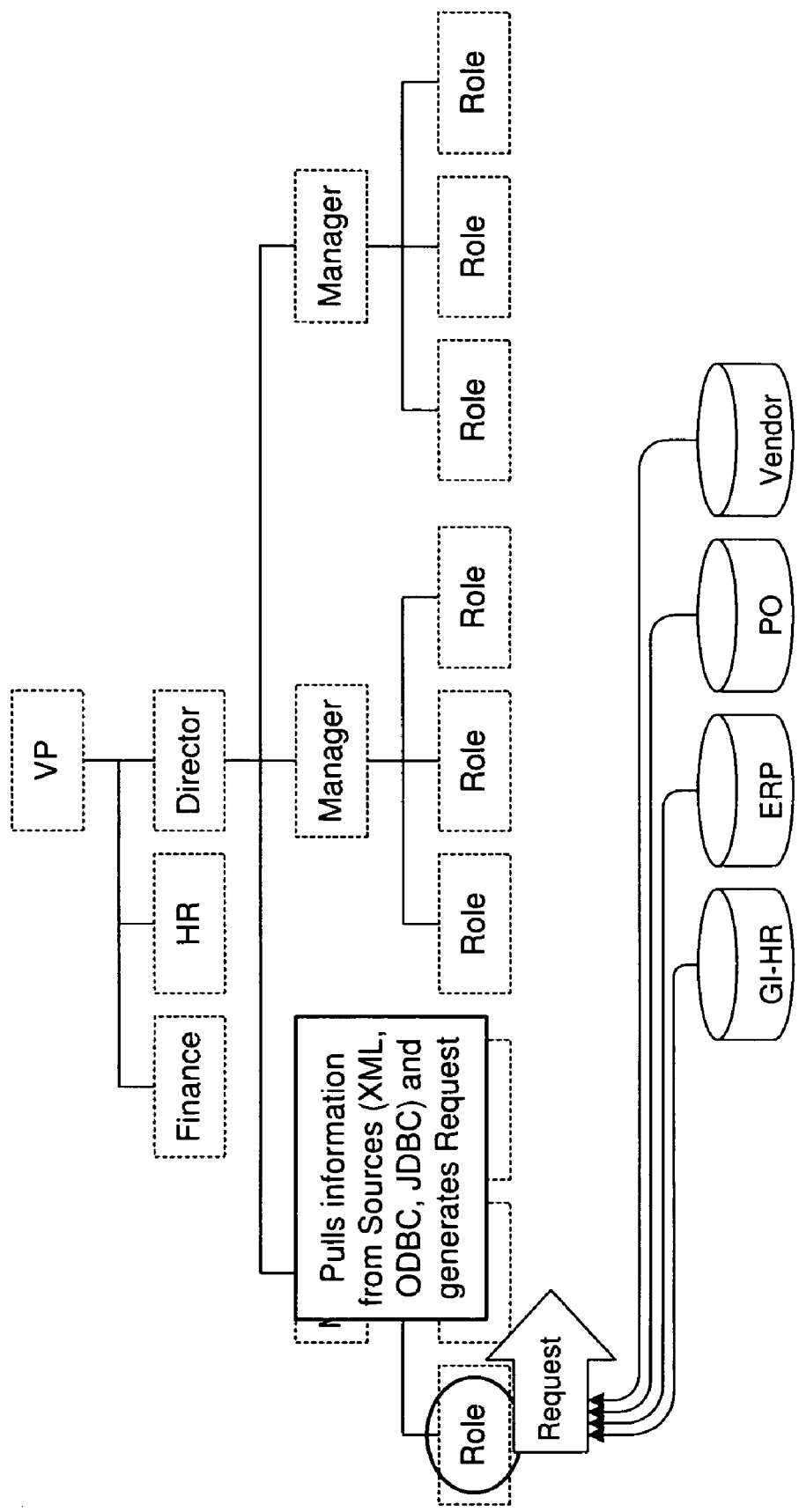
FIG. 8 is a diagram illustrating the building of a request in one embodiment of the invention.

Build. The request is built by pulling information from data sources which are available to the system. This is illustrated in FIG. 8. These sources may include internal sources of information such as position or employee data, ERP, financial, sales or MRP data. Data may also be pulled from external sources such as ASPs or vendors. The information pulled from the sources is used to populate predetermined data sets within the request. The user can then make changes to the information contained in the request. Changes made by the user may cause further data to be pulled from the internal and external sources. The building of the request also involves identification of trip points, selection of approvers based on the appropriate approval matrix, and identification of employees associated with the approving positions.

Summarize. After the request is built, it is summarized. Information associated with the request (e.g., the employees identified for approval of the request) is displayed, and the requestor can update or add to the information before the request is submitted for approval. In some cases, this may occur automatically without the need for user input. In other instances, the user may enter data such as justification notes. When the request is summarized, the necessary approval roles are determined from the corresponding approval matrix. If no approvers are required, the request may be automatically approved. If approvers are required, automated signature looping is triggered. This may occur automatically, or in response to the user submitting the request for approval.

Figure 9:
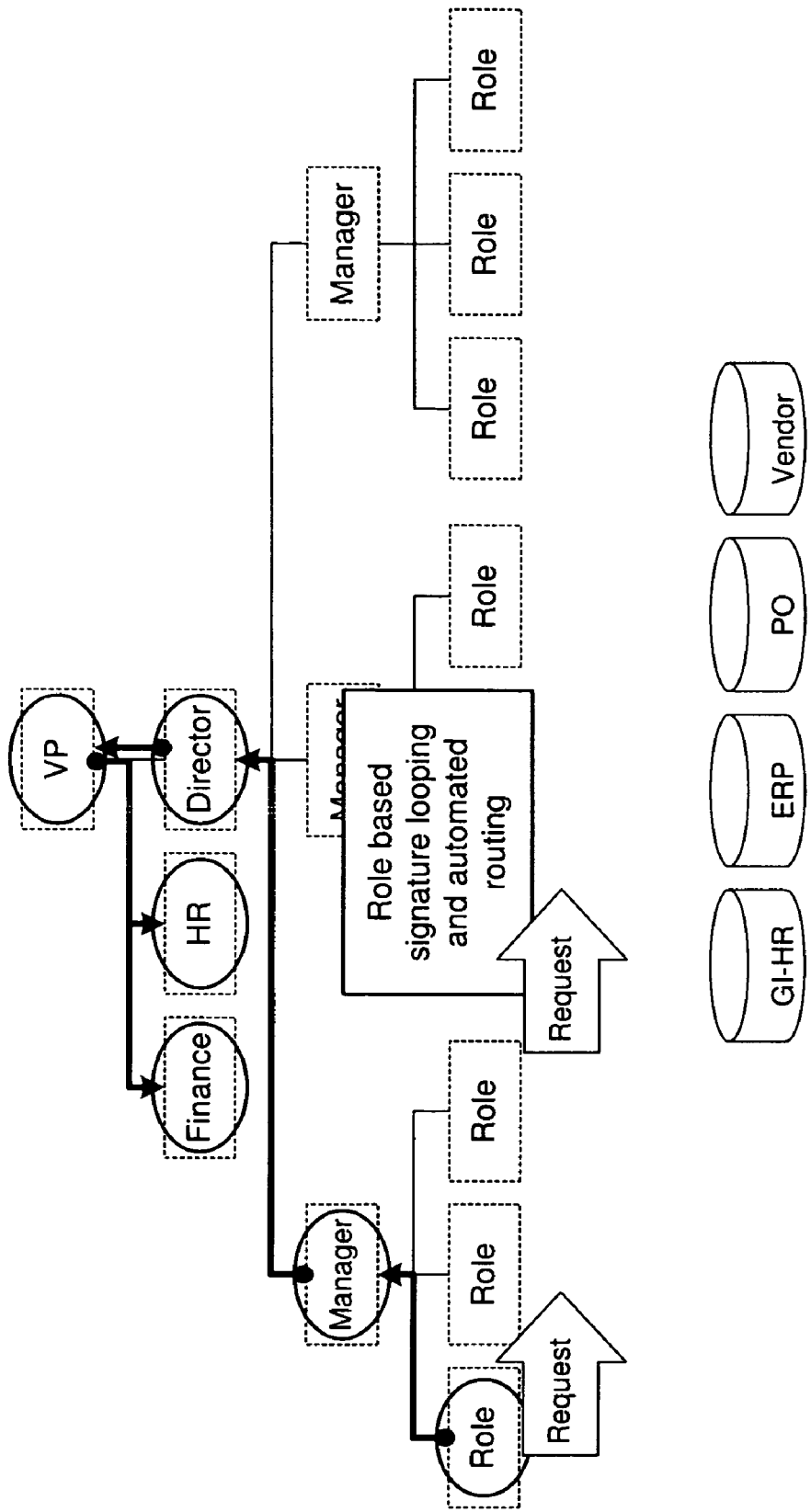
FIG. 9 is a diagram illustrating the selection of participants in a business process of a request in one embodiment of the invention.

Approval. After the request has been submitted for approval, the request is directed to each of the identified approvers. This is illustrated in FIG. 9. The status of the approval can be viewed by the requesting user, as well as the approving roles. As the request is approved (or as other actions are taken by the requester or approvers), this information is made available to the participants in the approval process. The approval process is complete when either all of the approvers have approved the request, or one of the necessary approvers has declined the request. Notifications can be sent to the participants at the end of the approval process. Notifications may also be sent to the participants after a predetermined aging period as reminders that the request is still pending.

Figure 10:
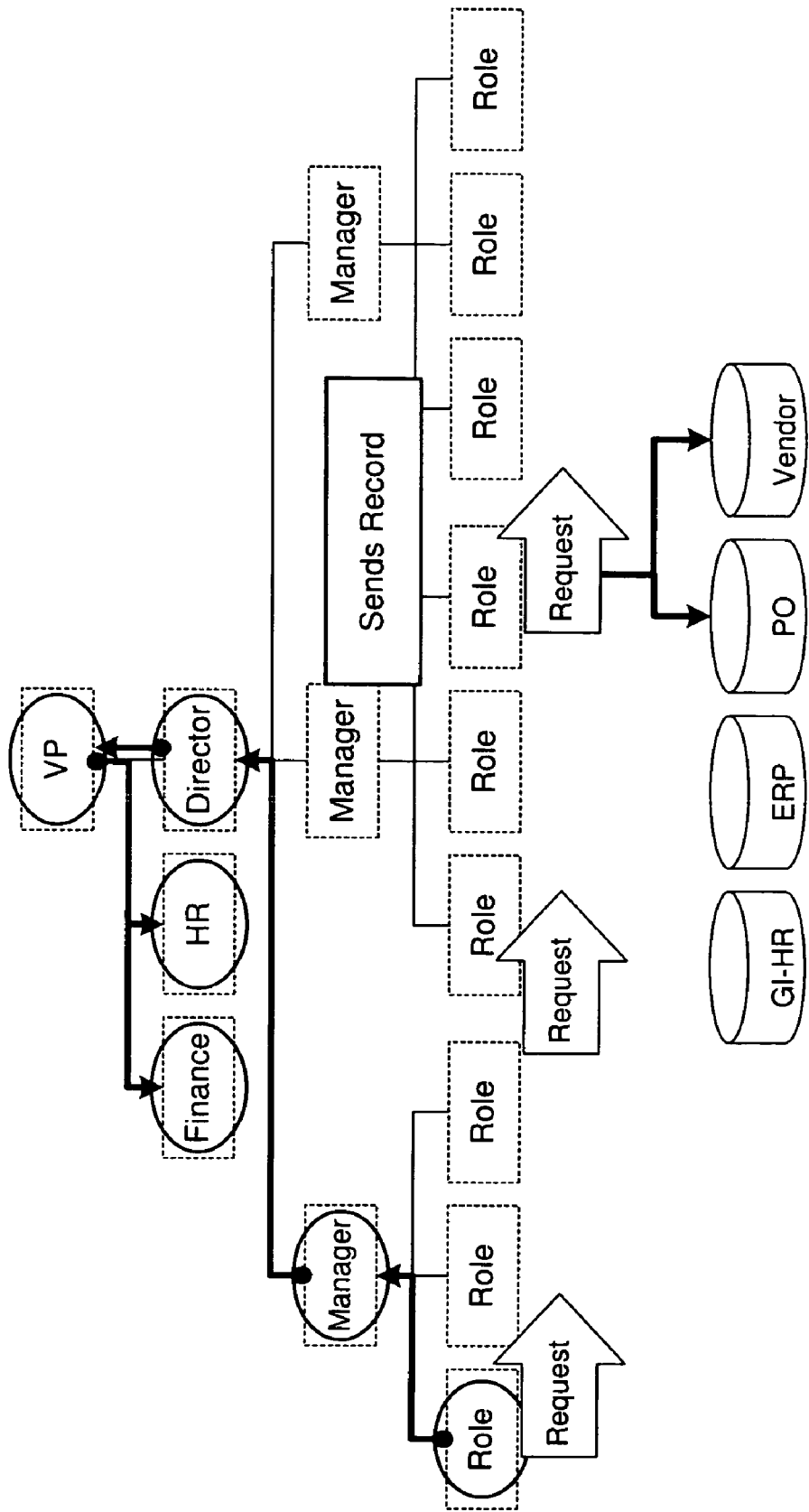
FIG. 10 is a diagram illustrating the execution or performance of a request in one embodiment of the invention.

Execute. After the request has been approved, it can be completed. Completion of the request may consist of performing the requested action, placing the request on hold, or canceling the request. This is illustrated in FIG. 10. Performance of the request may result in creation of new records in the system, modification of existing records, or other actions.

Request Template. A request template as used in one particular embodiment is shown below. Underlined information is fixed in this embodiment and is the same in all request processes. All non-underlined information is variable in this embodiment and is specific to each individual request process.

---

1. Access - Method and Location of Access
1.1. Predecessor Name or No Predecessor
2. Build
2.1. Description of Request Record
2.1.1. Source of Data (n)
2.1.1.1. Data Description
2.1.2. Request State = Build
2.1.2.1. Time/Date and user ID stamped
2.1.3. Request Status = Active
2.1.3.1. Time/Date and user ID stamped
2.2. Description of Data Change/Add
2.2.1. Specific Action (n)
2.2.1.1.1. Editable/Non-editable
2.3. Secondary Pull of Data
2.3.1. Source of Data (n)
2.3.1.1. Data Description
2.3.1.1.1. Editable/Non-editable
2.4. User Selects Reason for Request
2.5. User inputs justification
2.6. User summarizes request
2.6.1. Request State = Summarize
2.6.1.1. Time/Date and user ID stamped
2.6.2. Request Status = Active
2.7. User holds request -continued 2.7.1. Request State = Build
2.7.2. Request Status = Hold
2.7.2.1. Time/Date and user ID stamped
2.8. User cancels request
2.8.1. Request State = Build
2.8.2. Request Status = Cancel
2.8.2.1. Time/Date and user ID stamped
3. Summarize
3.1. Engages Automated Signature Looping to select Approvers
3.1.1. Lists approving position and approver names & contact information
3.2. Lists Original Information
3.3. Lists New/Changed Information
3.4. Ability for User to select additional approver by name
3.4.1. Can be null
3.5. Ability for User to select courtesy notification by name
3.5.1. Can be null
3.6. User sends for approval
3.6.1. Request State = Approval
3.6.1.1. Time/Date and user ID stamped
3.6.2. Request Status = Active
3.6.2.1. Time/Date and user ID stamped
3.7. User holds request
3.7.1. Request State = Summarize
3.7.2. Request Status = Hold
3.7.2.1. Time/Date and user ID stamped
3.8. User cancels request
3.8.1. Request State = Summarize
3.8.2. Status = Cancel
3.8.2.1. Time/Date and user ID stamped
3.9. Notification
4. Approve
4.1. All Approvers approves Request
4.1.1. Request State = Execute
4.1.1.1. Time/Date and user ID stamped
4.1.2. Request Status = Active
4.1.2.1. Time/Date and user ID stamped
4.2. Any Approver declines Request
4.2.1. Request State = Approval
4.2.2. Request Status = Decline
4.2.2.1. Time/Date and user ID stamped
4.3. Any Approver Holds Request
4.3.1. Request State = Approval
4.3.2. Request Status = Hold
4.3.2.1. Time/Date and user ID stamped
4.4. Requestor Cancels Request
4.4.1. Request State = Approval
4.4.2. Request Status = Cancel
4.4.2.1. Time/Date and user ID stamped
4.5. Approver inputs decision notes
4.6. Notifications
4.6.1. Can be resent to participants at a preset number of aging days.
4.6.2. Can be sent to the approver's next level of management at preset aging days.
5. Execute
5.1. Requestor Completes approved request
5.1.1. Request State = Complete
5.1.1.1. Time/Date and user ID stamped
5.1.2. Request Status = Active
5.1.3. Performs Requested Action
5.1.3.1. Data Source description
5.1.3.2. Description of information to Change/Add
5.2. Requestor rebuilds declined request
5.2.1. Request State = Build
5.2.1.1. Time/Date and user ID stamped
5.2.2. Request Status = Active
5.3. Requestor cancels approved request.
5.3.1. Request State = Execute
5.3.2. Request Status = Cancel
5.3.2.1. Time/Date and user ID stamped
5.4. Requestor Cancel declined request
5.4.1. Request State = Execute
5.4.1.1. Time/Date and user ID stamped
5.4.2. Request Status = Declined Request Variable Information. The preferred embodiment includes a number of built-in requests. In this embodiment, only the steps shown below are included in the built-in requests.

1. Access - How: What is the triggering mechanism?
1.1. Predecessor: Name Predecessor if any
1.2. Access Parameter: Role Access or No Access
2. Build
2.1. Request type: All/Business Processes/Organization/
2.1.1. Initial data Source: Where is the information coming from?
2.1.1.1. Data: What information is being pulled?
2.1.2. User Action:
2.1.3. Secondary data Source: Where is the information coming from?
2.1.3.1. Data: What information is being pulled?
2.1.4. User selects: What does the User select from dropdown menus?
2.1.5. User enters: What does the User fill in?
2.1.6. User edits: What does the User Change?
3. Summarize
4. Approve
5. Execute
5.1. Request Action: What does the Request do?
5.1.1. Data Destination: Where is the information going?
5.1.2. Description: What information is going?

Information and Reporting

The system provides metrics and reporting for each business process. The company knows what is being requested, what is being approved, what is about to execute and what is complete. Metrics can be rolled up across the entire organization or any business unit. Information can further be analyzed by function or role. Work-in-process, backlogs, cost, estimated completion, cycle time, and much more can be instantly generated to view trends, comparisons, and projections, and can be isolated for root cause analysis.

Information is captured systematically at each step of the Request Process. This provides a template for universal business process reporting through watershed and static reporting methods. Canned static reports pertaining to general organizational structure, people, purchasing, inventory and workforce issues are built in. Database queries can be run for additional analysis. Business Objects or Crystal Reports is available for advanced reporting and modeling.

Watershed reporting is the method of reporting volume, speed and falloff rates for each request process in a business process. This methodology is used to determine where a business process is inefficient or bottlenecked, and to project completion time and cost. Watersheds are often analyzed to find more efficient ways to process business.

Built in Reports—All reporting can be cut by role at any level and/or by organizational structure at any level, projected, current and historic and if applicable, associated costs. Examples of some of the built-in reports that may be provided are listed below. This list is intended to be illustrative rather than limiting.

Organizational Structure
    Role mix -
        % of one Role to total jobs or another Role
        FTE/Contingent mix
        Management span of control - how many direct and indirect subordinate positions per manager
        Requested, open, filled, terminated positions
        Movement and Transfers
Workforce
    Workload - number of Business Process actions over time
        Watershed - Requested, Approved, Executed
    Headcount - FTE, PTE, Contingent, Partners, Vendors
    Compensation - Disparity, creep, etc.
    Diversity - Utilization
    Attrition - Why, Where, When
    Staffing -continued

```
Watershed - Reviews, Interviews, Offers, Accepts, Starts
Employee Development - Movement, Training
    Performance - Planning, Results
    Experiences - Companies, Countries, Cultures
    Knowledge and skills - Languages, Certifications, Organizational
    Affiliations
Inventory and Purchasing - granulated by Item
    Purchasing - Projections, Commitments
    Inventory - Losses, Movement, Location
Business Processes
    Custom Report Builder
        Watershed
        Static
```

Administration. The central business process management system allows companies to manage all business processes from a single location. This is accomplished by linking access to roles in each request process, and by administering trip points and approval matrixes. In a preferred embodiment, the administration of the system is controlled by several rules: each subordinate position takes on the business process rules of its superior position; a subordinate position cannot change, delete or override the rules set by a superior position; and a subordinate position can add approvers to the Approval Matrix.

Administering Access. Each request process can be accessed by many Roles. A role must be associated with a specific request process to be able to access that request process. Access can be granted to a specific business process at any functional role level and/or at either title level. When linked, access to that request process is immediately available to all positions subordinate to the administrating position and containing that specific role.

If the request process requires a predecessor and access is null, the request will automatically build upon completion of the predecessor. If access is not null, a user must engage the engagement device (subject to access rules). If access is null in a request process not requiring a predecessor, no user engage the request and the request if effectively turned off.

Administering Approval. Each request has an approval matrix. The approval matrix is a selector of approver lists dependent on the selection made by trip points. The system selects the correct set of approvers through trip points preset against information in the request. Trip points are generally "quantity", "price", "date" or "days from a date", but can also include status of concurrent requests or the reason for the request. For example, an employee should not need more than one of the same training classes. If the employee requests one class, the company could set the approver as the direct manager only. But, if the employee orders two of the same class or if the employee already has taken that class, the company could add the HR generalist to the list of approvers by setting the quantity trip to 1 and adding the HR generalist to quantity approval matrix. As another example, a termination request may only require a HR generalist and the first level manager unless it is "for cause", which could require the outside counsel.

Purchasing Administration. The purpose of Purchasing Administration is to provide the ability to select a vendor and the vendor's catalog number for each purchasing request. This enables information to be pulled from the vendor's catalog server on current product information and price. It also allows the company to standardize the set of items that can be purchased for the workforce. This can be done one vendor at a time. It should be possible to standardize on Rosetta Net or similar industry standards. Most communications can be done via XML through the Internet. It may be necessary to develop a routing server for orders so that consistency can be maintained across multiple customers and multiple vendors.

Business Processor. In one embodiment of the present system, a closed loop business process engine or business processor is provided. The business processes on which the business processor operates can be a simple as a single request process, or a very complicated linking of request processes sequentially and in parallel triggering multiple internal company, and external partner and vendor actions. Each request process can automatically trigger multiple request processes in series or in parallel. This ability to link request processes allow companies to create a completely seamless business process for any purpose. In the preferred embodiment, a graphic interface is used to build Business Processes by constructing and linking Request Processes.

The system's Business Processor enables companies to rapidly build, integrate and deploy custom business processes for any purpose no matter how complex through an intuitive graphical user interface. No programming is required, which saves thousands of programming hours. Custom business processes are mapped around the way employees do business, not around the way software does business. The present system's highly scalable architecture supports integration with any modern application: CRM, Sales, ERP, Engineering, Manufacturing, HR, Staffing, Training and Development, Finance, General Ledger and Accounting, Legal, Documentation, Purchasing, Public Relations, Corporate Communications and more. The system can integrate with internal applications, hosted applications and application services. The present system does not require back end integration of legacy applications and enables the click and point building of custom business processes, which dramatically decreases implementation and deployment time for ERP systems.

Request Process Detail. In the preferred embodiment, the request process is a simple state machine. Access to information is governed by the state of the request. The states correspond to the basic functions of the request process: build; summarize; approval; execute; and complete. Each request state has a status: active; hold; cancel; or declined.

Management Control Center. The system's management control center allows companies to add and remove access and approvers simply by point and click linking of roles to business processes. This capability can be permitted at any level within the organization, which enables companies to establish threshold business rules across the entire organization while allowing its business units to tighten business rules as required.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for searching for a selected role within a hierarchical organizational structure comprising:
   (a) identifying a selected role by
      providing an approval matrix associated with the business process, wherein the approval matrix includes one or more rows and one or more columns, wherein each entry in the approval matrix is defined by a corresponding row and a corresponding column, wherein each column in the approval matrix defines a potential condition and each row defines an approval role, wherein each entry in the approval matrix defines whether the approval role in the corresponding row is required for the business process when the potential condition in the corresponding column is met,
      determining a set of conditions that apply to the business process,
      determining a set of entries in the approval matrix which are in columns defining potential conditions that are met by the conditions that apply to the business process,
      identifying the approval roles defined by the set of entries in the approval matrix as roles required to authorize the business process, and
      identifying one of the roles which is required to authorize the business process as the selected role;
   (b) identifying a first position within the organizational structure;
   (c) identifying a second position which is immediately above the first position in the organizational structure;
   (d) making a determination whether the second position is associated with the selected role and
      terminating the search when the second position is associated with the selected role and searching positions below the second position in the organizational structure if when the second position is not associated with the selected role;
   (e) repeating (d) from the second position when the selected role is not found among the positions below the second position in the organizational; and
   (f) when the selected role is found, saving and/or displaying the selected role.

2. The method of claim 1 wherein selecting the entry in the approval matrix comprises determining whether one or more trip points associated with the approval matrix have been triggered and, if so, selecting an entry corresponding to the triggered trip points.

3. The method of claim 1 wherein one or more of the roles associated with positions in the hierarchical organizational structure is not unique.

4. The method of claim 3 wherein the selected role is associated with a plurality of unique positions within the organizational structure.

5. The method of claim 1 wherein positions below the second position in the organizational structure are searched in accordance with a predetermined pattern.

6. The method of claim 1 further comprising defining the organizational structure as a hierarchical structure and defining a hierarchical role structure within which the roles associated with the positions are organized, wherein the hierarchical role structure is distinct from the hierarchical organizational structure.

7. The method of claim 6 wherein the hierarchical role structure comprises at least one of the structures consisting of: a hierarchical functional role structure; a hierarchical superiority role structure; and a hierarchical legal role structure.

8. The method of claim 6 wherein the hierarchical role structure comprises at least two of the structures consisting of: a hierarchical functional role structure; a hierarchical superiority role structure; and a hierarchical legal role structure.

9. The method of claim 6 wherein the hierarchical role structure comprises: a hierarchical functional role structure; a hierarchical superiority role structure; and a hierarchical legal role structure.

10. The method of claim 1 wherein the selected role comprises a first selected role and wherein the method further comprises searching for a second selected role.

11. The method of claim 10 wherein searching for the first and second selected roles comprises repeating (a)-(f) for each of the first and second selected roles.

12. The method of claim 10 wherein searching for the first and second selected roles comprises concurrently searching for the first selected role and the second selected role.

13. A method for obtaining approval for a business process comprising:
   selecting an approval matrix associated with the business process, wherein the approval matrix includes one or more rows and one or more columns, wherein each entry in the approval matrix is defined by a corresponding row and a corresponding column, wherein each column in the approval matrix defines a potential condition and each row in the approval matrix defines a corresponding approval role, wherein each entry defines whether the approval role in the corresponding row is required for the business process when the potential condition in the corresponding column is met;
   determining which of the columns in the approval matrix define potential conditions that are met by the conditons that apply to the business process;
   selecting a set of approval roles corresponding to rows in the approval matrix, as defined by the entries within the columns corresponding to the potential conditions that are met;
   identifying one or more positions corresponding to each of the approval roles in the selected set of approval roles; and
   obtaining approval from each of the identified positions.

14. The method of claim 13 wherein identifying a position corresponding to each of the roles in the set of roles comprises, for each role:
   (a) identifying a first position within the organizational structure, wherein the first position is associated with the initiation of the business process;
   (b) identifying a second position which is immediately above the first position in the organizational structure;
   (c) determining whether the second position is associated with the role;
   (d) selecting the position if the second position is associated with the role;
   (e) searching positions below the second position if the second position is not associated with the role; and
   (f) repeating (b)-(e) from the second position if the role is not associated with any of the positions below the second position in the organizational structure.

15. A method for identifying which of a plurality of roles is required to authorize a business process comprising:
  providing an approval matrix associated with the business process, wherein the approval matrix includes one or more rows and one or more columns, wherein each entry in the approval matrix is defined by a corresponding row and a corresponding column, wherein each column in the approval matrix defines a potential condition and each row defines an approval role, wherein each entry in the approval matrix defines whether the approval role in the corresponding row is required for the business process when the potential condition in the corresponding column is met,
  determining a set of conditions that apply to the business process,
  determining a set of entries in the approval matrix which are in columns defining potential conditions that are met by the conditions that apply to the business process,
  identifying the approval roles defined by the set of entries in the approval matrix as the roles required to authorize the business process, and saving and/or displaying the identified approval roles.

16. The method of claim 15 wherein selecting the entry in the approval matrix comprises determining whether one or more trip points associated with the approval matrix have been triggered and, if so, selecting an entry corresponding to the triggered trip points.

* * * * *